United States Patent [19] [11] Patent Number: 4,595,118
Azuma et al. [45] Date of Patent: Jun. 17, 1986

[54] AIR-BREATHER DEVICE FOR OIL CASING

[75] Inventors: Hitoshi Azuma; Masatoshi Niimi, both of Toyota, Japan

[73] Assignee: Toyota Jidosha Kabushiki Kaisha, Aichi, Japan

[21] Appl. No.: 778,962

[22] Filed: Sep. 23, 1985

[30] Foreign Application Priority Data

Oct. 31, 1984 [JP] Japan ............................ 59-164897[U]

[51] Int. Cl.[4] ............................................. B65D 41/04
[52] U.S. Cl. ..................................... 220/374; 220/203; 74/606 R
[58] Field of Search ............... 220/203, 373, 374, 209; 74/606 R; 137/846

[56] References Cited

U.S. PATENT DOCUMENTS 4,506,562 3/1985 Yamaura et al. .................... 220/374
4,512,499 4/1985 Uuskallio ............................. 220/374

Primary Examiner—George T. Hall
Attorney, Agent, or Firm—Parkhurst & Oliff

[57] ABSTRACT

An air-breather device for an oil casing is filled with oil and accommodates a driving mechanism, e.g., a differential gear casing of a vehicle. The air-breather device comprises a cylindrical breather plug deflector attached to the wall of the oil casing and having an end opening into the oil casing, a breather plug having an open end opening into the breather plug in the oil casing and the other open end which opens to the outside of the oil casing, the other open end being normally closed by a spring-urged cover, and a baffle plate attached to the breather plug deflector on the upstream side thereof, as viewed in the direction of flow of the oil such as to intercept the flow of oil which tends to flow into the opening of the end of the breather plug deflector within the casing.

6 Claims, 6 Drawing Figures

AIR-BREATHER DEVICE FOR OIL CASING

BACKGROUND OF THE INVENTION

1. Field of the Invention:

The present invention relates to an air-breather device for an oil casing filled with oil, in particular an oil casing in a vehicle driving system, such as a final gear casing filled with lubricating oil.

Description of the Related Art:

In general, an oil casing incorporated in a vehicle driving system, e.g., a final gear casing, encounters a problem in that the internal pressure of the casing is increased as a result of the temperature rise caused by the operation of mechanisms such as the gears in the oil case. This often results in external leakage of oil due to the pressure differential across the wall of the oil casing. Therefore, an oil casing of this kind is usually provided with an air-breather device which relieves the internal air pressure thereby preventing external leakage of oil, while preventing the entry of foreign matter into the oil casing. The conventional air-breather device incorporates a breather plug (referred to simply as "plug" hereinunder) which cannot prevent the external leakage of oil completely. Therefore, in the conventional air-breather device shown in FIG. 6, an opening 2A of a plug 2 which leads into the casing 3 is surrounded by a member which is referred to as a breather deflector 4 (referred to simply as "deflector" hereinunder), in such a way that the deflector 4 prevents splashes of oil from directly reaching the opening 2A of the plug, thus preventing the oil from leaking through the plug 2.

In a final gear case, the oil within the case is stirred vigorously, particularly when the gears are rotating at high speeds, so that the rate of recirculation of the oil, as well as the splashing of the oil, is increased to raise the level of the oil such as to wet the deflector 4. The deflector 4 is not so effective in preventing the leakage of oil when it is immersed in a bath of oil, although it is effective in preventing the leakage of splashed oil. For this reason, in the conventional air-breather device, the position of the plug is undesirably limited. Namely, the plug must be located in a portion where there is no risk of the plug being immersed in an oil bath.

SUMMARY OF THE INVENTION

Accordingly, an object of the present invention is to provide an air-breather device for an oil casing which is capable of preventing any external leakage of oil even when the breater plug and deflector are immersed in a bath of oil in the oil casing, thereby overcoming the above-described problems of the prior art.

To this end, the present invention provides an air-breather device for an oil casing filled with oil and accommodating a driving mechanism, comprising a breather plug attached through the wall of the oil casing and having a cover which is opened when the internal pressure of the oil casing is increased, a breather plug deflector disposed on the inner surface of the oil casing wall and carrying the breather plug, and a baffle plate provided on the breather plug deflector at the upstream side thereof, as viewed in the direction of flow of the oil, so as to intercept the flow of oil towards the breather plug. The baffle plate defines on its downstream side an air space into which the breather plug deflector opens, so that splashes of oil are prevented from leaking through the breather plug past the breather plug deflector.

According to the present invention, therefore, it is possible to prevent the leakage of oil without fail. In addition, the position of the air-breather device can be selected substantially with no restrictions.

DESCRIPTION OF THE PREFERRED EMBODIMENT

An embodiment of the present invention will be described hereinunder with reference to the accompanying drawings.

Figure 1:
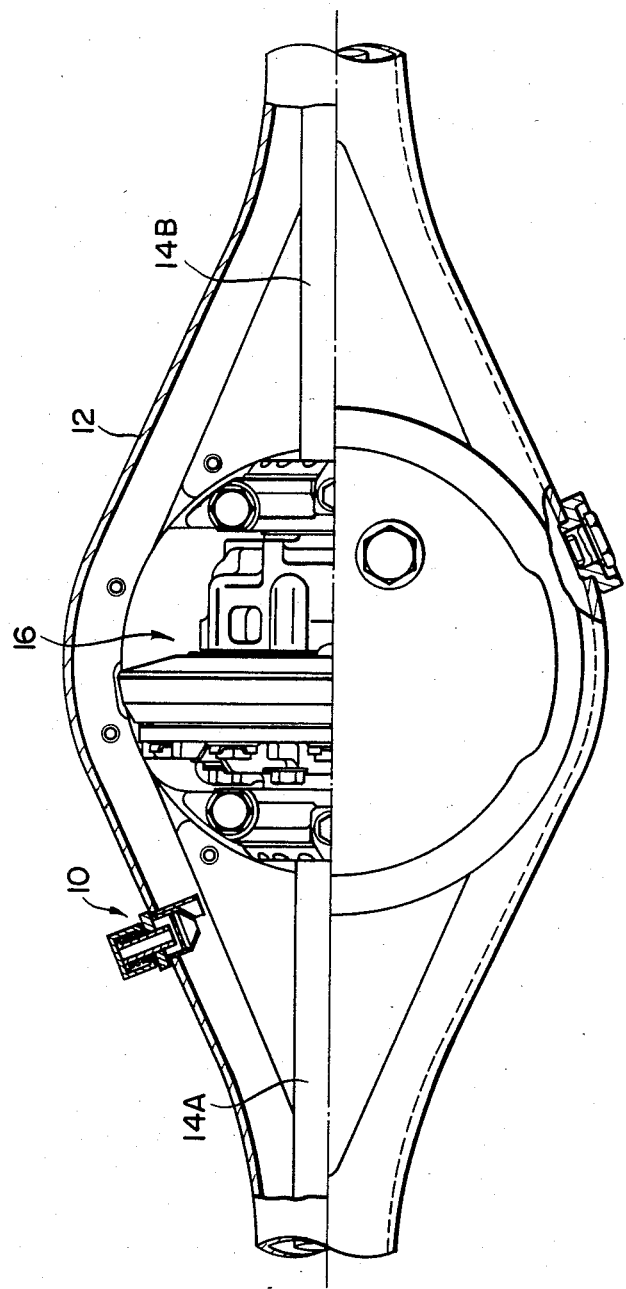
FIG. 1 is a vertical sectional view of an embodiment of the present invention.

FIG. 1 shows the final gear casing of a vehicle, as an example of an oil casing 12 to which the air-breather device of the invention is attached. As will be seen from this Figure, the final gear casing 12 accommodates a final gear 16 which consists of a planetary gear mechanism adapted to transmit the driving torque from a drive shaft (not shown) to left and right wheel axles 14A and 14B. The casing 12 is charged with oil up to a predetermined level above which is formed a free air space. The air breather device in accordance with the present invention, generally designated at a numeral 10, is adapted to be attached to the upper wall of the casing 12.

Figure 2:
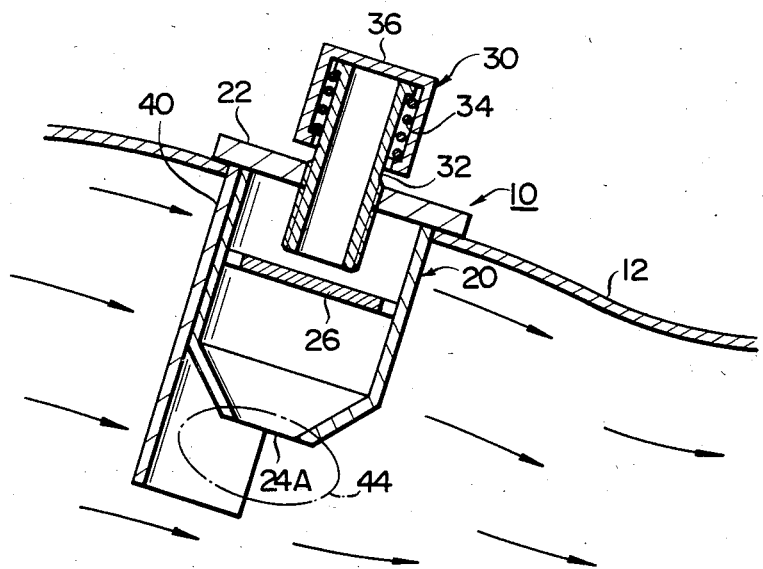
FIG. 2 is an enlarged sectional view of an essential part of an air-breather device in accordance with the present invention.

FIG. 2 shows a practical example of the construction for mounting the air-breather device 10 of the present invention.

The air-breather device 10 has a substantially cylindrical deflector 20 fixed to the wall of the casing 12, a plug 30 fixed to the deflector 20, and a baffle plate 40 which also is fixed to the deflector 20 and projects inward from the differential gear case 12.

Figure 3:
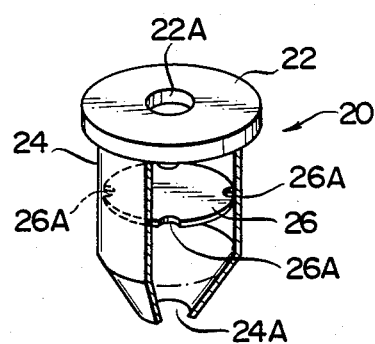
FIG. 3 is a perspective view of the air-breather device with a portion of the deflector omitted.

As will be seen from FIG. 3, the deflector 20 is provided with a flange 22 which has a plug mounting portion 22A. The deflector also has a cylindrical deflector body 24 extending downward from the flange 22. An oil-stopper plate 26 disposed in the deflector body 24 has four cut-outs which are arranged at a constant pitch around the circumference of the oil stopper plate 26. These cut-outs constitute passages for air. The lower end opening 24A of the deflector body 24 is constricted so as to minimize the entry of the flow and splashes of oil into the deflector body 24. The plug 30 consists of a cylindrical plug body 32 and a cover 36 secured to an upper end opening of the plug body 32. The plug body 32 is screwed into the plug mounting portion 22A of the deflector 20, such that the lower open end of the plug body 32 projects into the deflector body 24. The plug body 32 extends out of the casing 12. A cover 36 which fits in the upper end opening of the plug body 32 is urged by a compression spring 34 such as to normally close this opening. However, when the internal pressure of the casing 12 is increased, the cover 36 is forcibly lifted to open the upper end opening of the plug body 32 overcoming the force of the compression spring 34, such as to allow the internal high pressure of the casing 12 to be relieved through the gap formed between the brim of the upper end opening of the plug member 32 and the cover 36.

Figure 4:
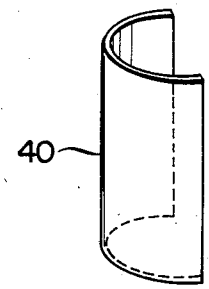
FIG. 4 is a perspective view of a baffle plate incorporated in the air-breather device.
Figure 5:
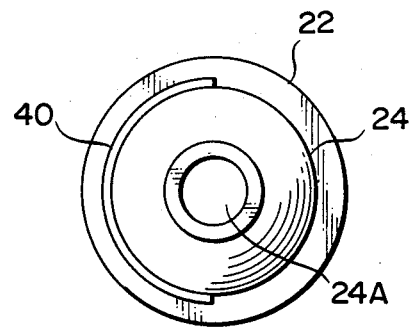
FIG. 5 is a bottom plan view of a deflector incorporated in the air-breather device of the present invention.
Figure 6:
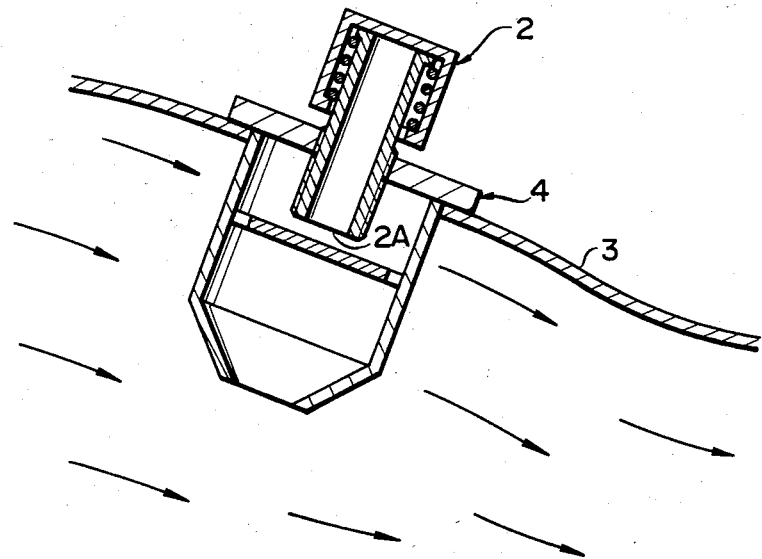
FIG. 6 is a vertical sectional view of a deflector in a conventional air-breather device.

As will be seen from FIGS. 4 and 5, the baffle plate 40 has a semi-cylindrical form matching the outer peripheral surface of the deflector body 24 and is fixed thereto by, for example, welding. The height of the baffle plate 40 is greater than that of the deflector body 24, so that the lower end portion of the baffle plate 40 projects downward beyond the lower end opening 24A of the deflector body 24.

In the assembly of the air-breather device of the present invention, the baffle plate 40 is first attached to the deflector 20 which is then fixed to the wall of the casing 12 by welding such that the baffle plate 40 is positioned on the upstream side of the deflector 20, as viewed in the direction of flow of the oil. The plug 30 is then screwed and fixed to the plug mounting portion 22A of the deflector 20.

During the operation of the final gear in the casing, the level of the oil in the final gear case is raised as a result of high speed rotation of the gears so that the deflector 20 is immersed in the oil bath. However, the baffle plate 40 effectively interrupts the flow of oil so that an air space 44 surrounding the opening 24A in the deflector 20 is formed on the downstream side of the baffle plate 40, so that the entry of oil into the deflector body 24 is prevented.

As will be understood from the foregoing description, in the air-breather device of the present invention, the entry of oil splashes into the deflector body 24 is prevented without fail by virture of the baffle plate 40 which also prevents the flow of oil from coming into the deflector body 24, even when the oil level rises far enough to immerse the deflector 20. In consequence, the present invention prevents the undesirable external leakage of oil through the plug.

What is claimed is:

1. An air-breather device for an oil casing filled with oil and accommodating a driving mechanism such as a gear means, said air-breather device comprising:
   a cylindrical breather plug deflector attached to a wall of said oil casing and having an end opening into said oil casing;
   a breather plug having an open end opening into said breather plug in said oil casing and the other open end opening to the outside of said oil casing, said other open end being normally closed by a cover which is biased in the closing direction by a spring means; and
   a baffle plate attached to said breather plug deflector on the upstream side of said breather plug deflector as viewed in the direction of flow of said oil such as to intercept the flow of oil which tends to flow into the opening of said end of said breather plug deflector within said casing.

2. An air-breather device for an oil casing according to claim 1, wherein said casing is a differential gear casing of a vehicle.

3. An air-breather device according to claim 1, wherein said baffle plate projects downward beyond said open end of said breather plug deflector.

4. An air-breather device according to claim 1, wherein said baffle plate has a semi-cylindrical shape which matches the outer peripheral surface of said breather plug deflector.

5. An air-breather device according to claim 1, wherein said baffle plate is integrated with said breather plug deflector by welding.

6. An air-breather device for a differential gear casing filled with oil and accommodating a differential gear of a vehicle, said oil purging device comprising:
   a substantially cylindrical breather plug deflector attached to said casing and having a restricted opening in one end thereof projecting inward of said casing, said breather plug deflector accommodating at an intermediate portion thereof with an oil stopper plate which is provided with air relieving notches;
   a breather plug including a substantially cylindrical plug body having one end opening into said breather plug deflector towards said oil checking plate, and the other end opening to the outside of said casing and normally closed by a cover which is urged in the closing direction by a spring means; and
   a substantially semi-cylindrical baffle plate fixed by welding to the upstream portion of said breather plug deflector as viewed in the direction of flow and projecting downward beyond the open end of said breather plug deflector in said casing.

* * * * *